Dec. 6, 1932.  T. L. FAWICK  1,889,957
TRANSMISSION
Filed Nov. 8, 1926  3 Sheets-Sheet 1

Fig. 1.

Dec. 6, 1932.    T. L. FAWICK    1,889,957
TRANSMISSION
Filed Nov. 8, 1926    3 Sheets-Sheet 2

Dec. 6, 1932.   T. L. FAWICK   1,889,957
TRANSMISSION
Filed Nov. 8, 1926   3 Sheets-Sheet 3

UNITED STATES PATENT OFFICE

THOMAS L. FAWICK, OF RACINE, WISCONSIN, ASSIGNOR TO BROWN-LIPE GEAR COMPANY, OF SYRACUSE, NEW YORK, A CORPORATION OF NEW YORK

TRANSMISSION

Application filed November 8, 1926. Serial No. 146,917.

My invention has to do with change speed gearing and more particularly to transmissions of the same general character as that disclosed in my three Patents, No. 1,495,782, No. 1,515,850, and No. 1,524,476. Specifically speaking, I provide a novel type of transmission employing internal gears including an internal gear ring of the same general type as that disclosed in my co-pending patent application Serial No. 739,999, filed September 26, 1924.

Now in the operation of the internal type of gearing the gear teeth mesh considerably more gradually than do the gear teeth of spur gears. Also, the internal gears which I employ have more gear teeth in actual engagement than do spur gears. Thus it will be apparent that this form of gearing results in a relatively quiet transmission. Then, too, the centrifugal action of the internal gears causes part of the lubricating fluid to be retained between the teeth of the gears instead of casting the lubrication outwardly, as is the case with spur gears, and thus insures a more complete lubrication of the gear teeth. Internal gears not only minimize the chattering present in the transmission, but also reduce considerably bearing and gear wear.

The present construction, like that of each of my aforesaid inventions, is associated with and connected to the usual accelerating and reverse transmission of a motor vehicle where, as is evident, the weight is a sprung weight.

In accordance with the general features of my present invention, I have devised a transmission wherein auxiliary internal gearing of the same general character as that disclosed in my previously mentioned co-pending application is positioned in a novel manner between the engine and the standard transmission. The principal advantages of such an arrangement are briefly as follows:—

In the first place, the auxiliary gearing is subject to less torque and hence has less wear due to its not being subjected to the same torque as the main transmission which operates at lower speeds and is connected directly to the rear axle of the vehicle through the propeller shaft. That is to say, the auxiliary transmission operates at engine or relatively high speed and hence is not subject to a multiplied torque load of the transmission of the vehicle. This feature is ideal for the reason that it does not necessitate any changes in the size and weight of the standard accelerating and reverse transmission which is already built to operate under a multiplied torque load.

Moreover, the auxiliary gearing can be made of lighter and smaller parts than when it is located in the rear of the standard transmission.

Secondly, it facilitates the shifting of the gears of the auxiliary transmission and, in fact, permits of a common shift rod for both the standard and auxiliary gear sets.

Thirdly, it enables a better bearing support for the intermediate shaft positioned between the engine and the transmission; and Lastly, this arrangement will permit of a shorter propeller shaft. Obviously, by reducing the length of this shaft the play thereof will be minimized.

More specifically, I associate with the engine shaft an axially shiftable pinion positioned between the clutch and the accelerating and reverse transmission adapted to be moved into mesh with either an internal gear ring or a clutch socket. The clutch socket comprises an internal gear connected to the principal shaft of the transmission for a direct driving connection between the latter shaft and said clutch shaft. When the pinion is in mesh with the internal gearing an indirect drive results, which may be either an over or an under drive, as the case may be.

I also provide novel shifting mechanism for the transmission including a common shift rod for the main and auxiliary gear trains. This mechanism permits of the shifting of the shiftable pinion when the rod is in high speed position, and the pinion can be left at either of the two positions without interfering with the the shifting of the gears of the accelerating and reverse transmission. Now when the pinion is engaged by the clutch socket for a direct drive it is possible to obtain the usual three forward speeds and one reverse speed. By shifting the pinion into engagement with the gear ring for an indirect drive a fourth speed can be obtained without the necessity of shifting the high gear of the standard transmission. In other words, you can go directly from high into the fourth speed. Then, by shifting the rod so that it is out of high gear, two additional forward speeds can be obtained through the first and second speed gears of the gear train. A second reverse speed can be accomplished by simply shifting the gears of the gear train into mesh with the reverse idler when the shiftable pinion is in engagement with the clutch socket. Thus, all told, it is possible to secure six different forward speeds and one reverse speed with my novel transmission.

Furthermore, I contemplate the provision of novel guide channels associated with the shifting mechanism for guiding the shift rods in their movement. These channels are preferably disposed in parallel relationship, and are adapted to also lock the shift rod against movement when in certain positions.

Other objects and advantages of my invention will more fully appear from the following detail description taken in connection with the accompanying drawings which illustrate one embodiment thereof and, in which:—

Referring now to the drawings in detail in which like reference numerals designate similar parts throughout the several views, 10 denotes generally the clutch housing of a conventional motor vehicle. Extending through this housing 10 is the usual horizontal shaft 11 coupled to the crank shaft of the engine (not shown). This shaft 11 may be connected to the crank shaft of the engine by any suitable clutch mechanism (not illustrated). The clutch housing 10 has formed integral therewith an extension 12 through which the splined end 13 of shaft 11 projects. A flange 14 is formed integral with the extension 12 and is fastened to a transmission housing 15. This housing 15 serves to enclose an accelerating and reverse transmission designated generally by the reference character 16.

The interior of the extension 12 is separated from the inside of the clutch housing 10 by means of a plate 17 fastened by bolts 18 to the housing 10. These bolts 18 are preferably threaded into a flange 19 formed integral with the housing. The central portion of the plate 17 is formed into a cup-like shape, indicated at 20, in order to accommodate an annular ring of felt 21. This cup-like portion 20 is circular in shape and surrounds the shaft 11. A ring 22 cooperates with the portion 20 in retaining the felt 21 in place about the shaft 11. This felt serves to prevent oil from leaking into the clutch housing around the shaft 11.

Slidably mounted upon the splined end 13 of shaft 11 is a pinion 24 having a hub 23. The pinion and its housing are located in the extension 12 of the clutch housing. Also the hub 23 has formed integral therewith a collar 25 having an annular channel 26. Positioned within the interior of the extension 12 is a shift arm 27 having its lower end 28 formed to fit in the channel 26 of the collar 25. The upper end of this arm 27 is keyed to a shift rod 30 by means of a Woodruff key 31. Furthermore, the upper end of the arm 27 has a hub-like portion 32 held in place on the rod 30 by means of a nut 33 threaded onto the end of the rod 30. This shift rod 30 will be described more fully in connection with the shifting mechanism of my novel transmission.

Pinion 24 meshes with the integral gear teeth 34 of a gear ring 35. This gear ring 35 is disposed in the extension 12 and is disposed about the splined end 13 of shaft 11. The gear ring 35 has formed integral with it an external gear portion 36, the teeth of which mesh with an internal gear 37. It will be observed that the gear ring 35 is positioned eccentric with respect to the shaft 11. Also, the internal gear 37 has formed integral with it an internal toothed element 38 comprising a clutch socket. The pinion 24, as will be discussed more fully hereinafter, is adapted to be moved into cooperation with the clutch socket 38 for a direct drive.

The internal gear ring 35 has a substantially flat peripheral portion 39 which serves as the inner race for a roller bearing unit 40. Disposed about the peripheral portion 39 and spaced therefrom is a ring 41 which constitutes the outer race of the roller bearing unit. The roller bearing includes a plurality of rollers 42 disposed between the two previously described races, each of which has formed integral therewith a V-shaped roller 43. The two races 39 and 41 have formed in them suitable V-shaped grooves for receiving the peripheries of these V-shaped rollers 43. I have designated the V-shaped groove in the surface 39 by the reference character 44 and I have designated the groove in the outer race by the reference character 45. The grooved rollers 43 are held in place in their respective grooves by means of a ring 47. Also, the rollers 42 may be interconnected in the usual manner by means of ring 48 and 49. As of old, the roller bearing unit 40 is of a well known construction and is designed to take both radial and end or lateral thrust.

Figure 1:
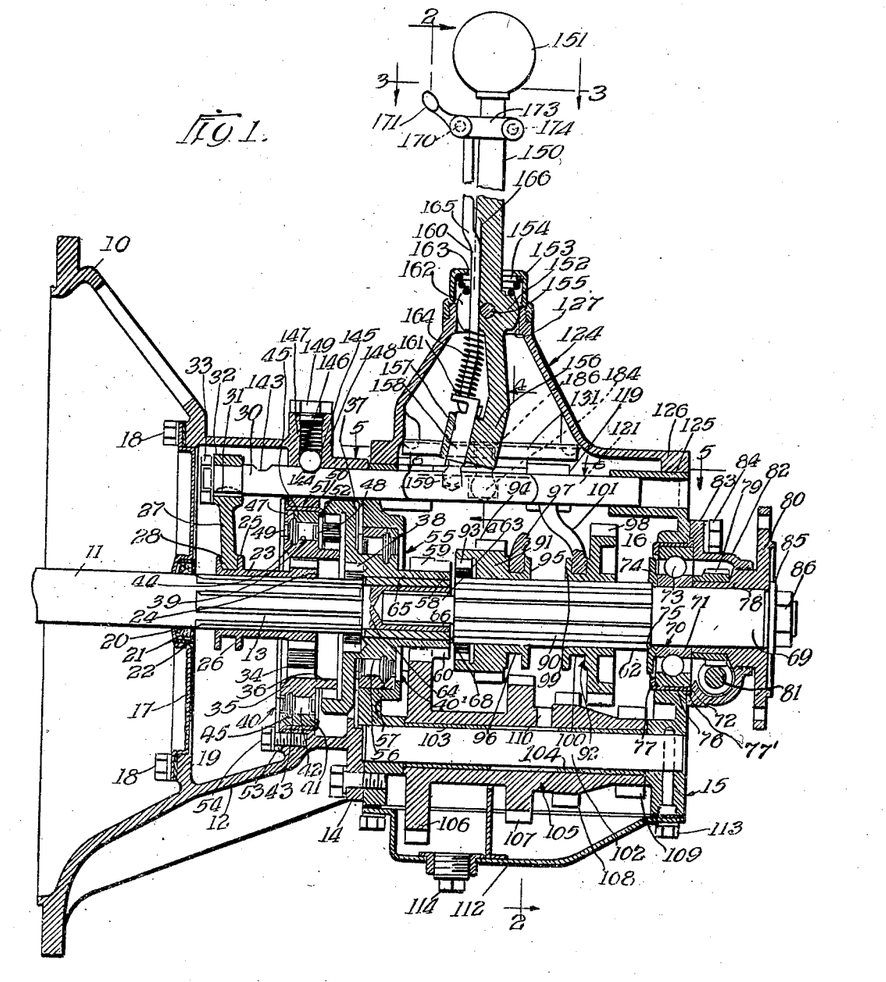
Figure 1 is a vertical sectional view through my novel transmission illustrating both the auxiliary and accelerating and reverse gear train.

It will be noted that the outer race 41 is held against movement in one direction by an annular member 50 positioned between it and the flange 51 of the housing extension 12. This ring 50 includes an inwardly extending flange portion 52 engaging the side of the outer race member 41, as shown in Figure 1. Also I prevent movement of the various parts of the unit 40 in another direction by means of the clamping ring 53 secured to the flange 51 of the extension 12 by means of bolts 54.

The roller bearing unit 40 cooperates with the extension 12 of clutch housing 10 to provide an antifrictional support for the splined end 13 of shaft 11. It will be evident from Figure 1 that the bearing is disposed about that portion of the end 13 associated with the movable pinion 24 and is adapted to take up both the radial and endwise thrust of the internal gears previously described.

The internal gear 37 and socket member 38 are formed integral and are parts of a common member 55. This member 55 includes a substantially annular flat hub portion 56 which constitutes the inner race of a roller bearing unit 40', which is of substantially the same construction as the roller bearing unit 40. This roller bearing unit 40' is positioned between the annular hub portion 56 and a flange 57 of the transmission housing 15.

One end of the member 55 projects into the interior of the housing 15 and has formed integral therewith a pinion 58 including two sets of external gear teeth 59 and 60.

I shall now proceed to describe in detail the accelerating and reverse transmission 16, as well as the mechanism associated therewith.

Located in the transmission housing 15 is an intermediate shaft 62 disposed in axial alignment with the shaft 11. The forward end of this shaft 62 is reduced as indicated at 63 and telescopes a reduced portion 64 of the shaft 11. This reduced portion 64 extends into an opening 65 in the member 55 and serves as a bearing for one end of the shaft 62. Positioned between the end 63 of the shaft 62 and the portion 64 is a suitable bearing 66. Also, positioned between the portion 64 of shaft 11 and the inner wall of the member 55 is a roller bearing unit 68 which provides an anti-frictional support for both of the two shafts 11 and 62.

The other end of shaft 62 is reduced at 69 and is journaled in a ball bearing unit 70. This unit includes a pair of races 71 and 72 between which are disposed a plurality of balls 73. The inner race 71 is held in position at one side by means of a ring 74 which abuts a shoulder 75 of the shaft 62. The outer race 72 is retained in place by a cup member 76 having a lateral inwardly extending flange 77. This flange 77 extends towards the ring 74 and serves to hold the outer race from movement in one direction. The inner race 71 is held against movement on the other side by a hub portion 78 of a coupling member 80.

Fastened to the hub portion 78 is a small worm wheel 79 which meshes with a worm 81 connected to the odometer of the vehicle. The worm and the worm wheel are enclosed by a housing 82 including a flange 83. This flange 83 is secured to the housing 15 by means of bolts 84 and also serves to retain the outer race 72 of the ball bearing unit in its proper position. In other words, this flange 83 cooperates with the lateral flange 77' of member 76 to prevent movement of the outer race of the bearings. The coupling member 80 is locked in place on the shaft end 69 by means of a washer 85 and a nut 86 threaded onto the extreme end of the shaft 62. This coupling 80 is capable of being connected to a similar coupling member on a propeller shaft (not shown).

The intermediate portion 90 of shaft 62 is splined and carries a pair of shiftable gear members 91 and 92. The gear member 91 comprises a clutch socket 93, and external gear 94, and a collar 95. The collar 95 has an annular channel 96 for receiving one end of a shift arm 97, which will be described more fully hereinafter. The shiftable member 92 comprises an external gear 98 and a collar 99 having an annular channel 100 adapted to receive one end of a shift arm 101.

Also located in the housing 15 is a counter or lay shaft 102 suitably supported at its ends in the housing. This shaft 102 is disposed parallelly to the shaft 62 and has mounted thereon a plurality of gears cooperable with the gears on the shaft 62. Mounted on this shaft 102 are a pair of bushings 103 and 104. These bushings carry a gear member designated generally by the reference character 105. The member 105 comprises four gears 106, 107, 108 and 109, all of which are of the spur type. These gears are suitably spaced from each other and are adapted to cooperate with the external gears 59, 94 and 98 associated with the shaft 62. Also it should be noted that the member 105 has an opening 110 for permitting the oil to get to the bushings 103 and 104.

The four gears 106, 107, 108 and 109 are positioned in the lower part of the casing 15.

It will be noted that gears 106 and 107 extend a slight way out of the casing, but are enclosed by the cover member 112 fastened to the underside of the casing. This cover 112 is secured by bolts 113 to the base of the transmission casing 15 and, in reality, constitutes an oil sump. A drain plug 114 is threaded into the cover member 112 and is adapted to be removed to permit of the draining of the oil from the casing.

Gear 106 is adapted to at all times mesh with the gear teeth 59 formed integral with the member 55. This gear serves to couple the shaft 11 to the counter shaft 102. The gear 107 is adapted to be engaged by the gear 94 and may be called a second speed gear. On the other hand, gear 108 is adapted to be engaged by gear 98 and may be termed a first or low speed gear. The gear 109 is at all times in mesh with a reverse gear 115 suitably carried on a shaft 116 connected to the casing 15. It will be obvious that the gear 98 is adapted to be moved into cooperation with the gear 115 when a reverse drive is desired. This reverse gear arrangement is preferably of a conventional construction and does not, per se, constitute a part of my present invention. It will be noted from Figure 2 that the housing 15 is provided with an enlargement 117 for accommodating the reverse gear mechanism just described.

At this time I wish to call the attention of the reader to the fact that the third speed may be accomplished by moving the clutch socket 93 of member 91 into cooperation with the clutch teeth 60 of the member 55. Also when the pinion 24 is in engagement with the clutch socket 38 and the socket 93 is in mesh with the teeth 60, a direct drive will result between the shaft 11 and the shaft 62. This drive constitutes the third speed of my transmission. I shall now proceed to describe in detail my novel shifting mechanism.

The shift arm 97 is provided with a collar 118 suitably fastened to a longitudinal shift rod 120. Similarly, the shift arm 101 is furnished with an annular collar 119, which is suitably connected to a longitudinal shift rod 121. The shift rods 120 and 121 are disposed parallel to each other and are located in the upper part of the casing 15. Each of these two rods is capable of a reciprocal movement.

From the foregoing it will be obvious that the rod 121 is adapted to be reciprocated to move the gear 98 either into engagement with the reverse gear or into cooperation with the first or low speed gear 108; and the rod 120 is adapted to be reciprocated to effect either a second or a third speed.

Figure 5:
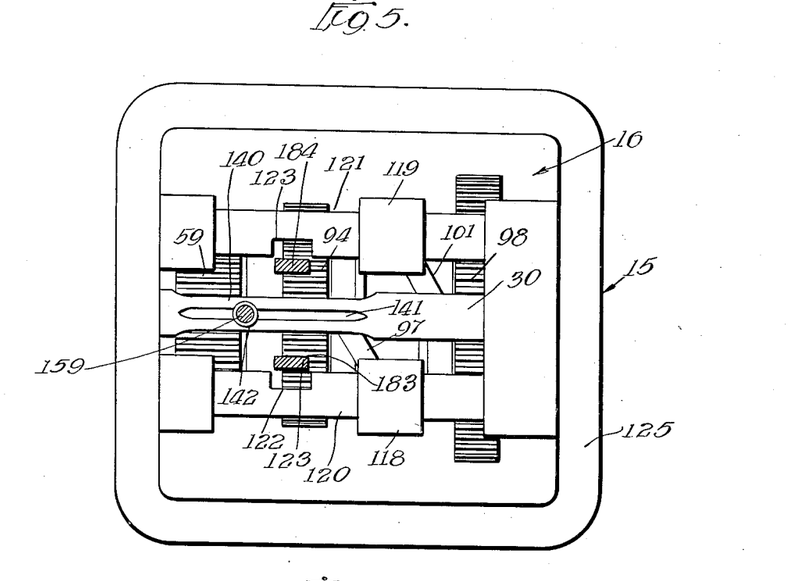
Figure 5 is a view taken on the line 5—5 of Figure 1, looking downwardly.
Figure 6:
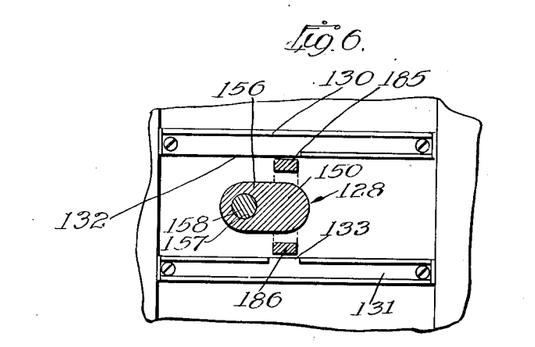
Figure 6 is a bottom plan view partly in section taken on the line 6—6 of Figure 1 and drawn to an enlarged scale.

The rod 120, as best shown in Figure 5, is equipped with a vertical slot 122 adapted to cooperate with the shifting rod to be hereinafter described. Similarly, the rod 121 is provided with a vertical slot 123 also adapted to cooperate with the shifting rod or lever (Figure 5).

Figures 2, 3, 4:
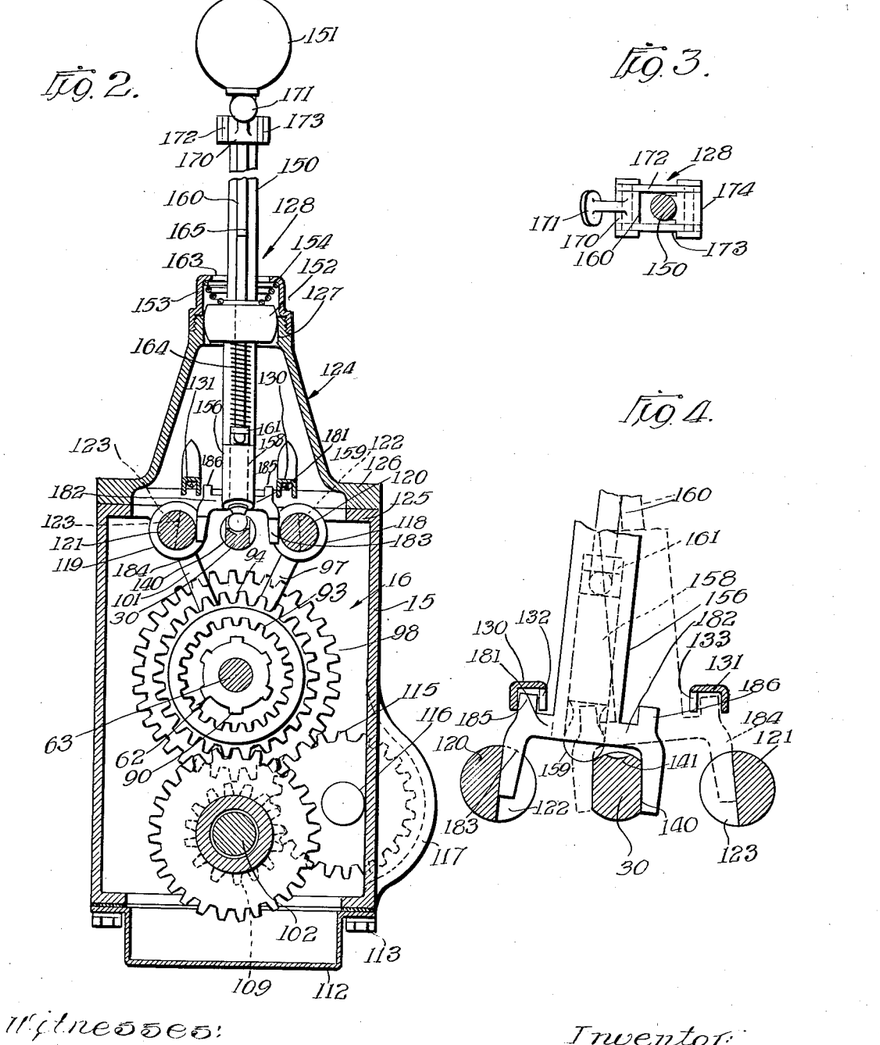
Figure 2 is a sectional view taken on substantially the line 2—2 of Figure 1, looking in the direction indicated by the arrows.
Figure 3 is a detail view partly in section taken on line 3—3 of Figure 1, looking downwardly.
Figure 4 is an enlarged fragmentary view partly in section taken on the line 4—4 of Figure 1 looking in the direction indicated by the arrows.
Figures 7, 8:
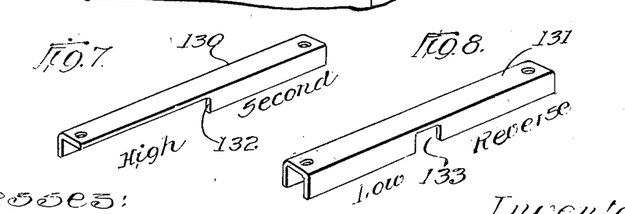
Figure 7 is a perspective view of one of the channels associated with my novel shifting mechanism.
Figure 8 is a perspective view of the other channel of my shifting mechanism.

The top of the casing 15 is provided with a rectangular flange 125 to which is fastened a flange 126 of a cover or top member 124 (Figure 2.) The cover extends upwardly and is provided with an aperture or opening 127 thru which extends a shift rod or lever, designated generally by the reference character 128. Suitably fastened to the cover 124 are a pair of parallel channel members 130 and 131 associated with the rods 120 and 121, respectively. Each of these channels comprises a section of channel iron, as is obvious from Figures 7 and 8. These channels are disposed parallel with the two rods 120 and 121. Channel 130 has one-half of one of its legs cut away, as indicated at 132 in Figure 7. Also, channel 131 has a slot 133 cut into one of its legs, as shown in Figure 8. The slot 133 is adapted to align with the slot 123 in the rod 121. Similarly, the end of the cut away or slotted portion of the channel 130 is adapted to align with the slot 122 in the shift rod 120. These two channel members serve to lock the shift rod against lateral movement when it is in either first, second, or reverse positions. That is to say, in order to move the shift rod, as will become more apparent hereinafter, the same must be moved to a neutral position when it is in either first, second, or reverse positions.

Also at this time it should be noted that the shift rod 30 described previously is situated in a position between the two rods 120 and 121, as is apparent from Figure 5. This rod 30 has a reduced intermediate portion 140, the purpose of which will be more fully explained when the operation of the shifting mechanism is described. Also, this reduced portion is provided with an arcuate shaped slot 141 communicating with an annular opening or aperture 142.

Referring to Figure 1, it will be observed that the end of the rod 30 associated with the arm 27 is provided with a pair of V-shaped notches 143 and 144 adapted to receive a ball 145. This ball is at all times urged into engagement with the rod by means of a spring 146 disposed in a pocket 147 formed in a lug 148. This lug 148 is preferably formed integral with the extension 12 of the clutch housing 10. The spring 146 is retained in place within the pocket 147 by means of a small cap screw 149 threaded into the boss or lug 148. The ball 145 is adapted to retain the rod 30 in the position to which it is shifted. Since the rod 30 is capable of being moved into two different positions, I have provided two slots 143 and 144 for engaging the ball 145. Now, of course, it is to be understood that although I have not illustrated any similar locking means for the rods 120 and 121, any suitable or conventional locking means may be employed for locking these rods in the positions to which they are moved. If it is so desired, a ball construction such as that just described may be used in connection with either the rods 120 or 121.

The shift lever 128 comprises a rod 150 having threaded upon its upper end a knob or onyx ball 151. Also, the rod 150 has an intermediate semi-spherical portion 152 which is pivotally mounted in the opening 127 of the casing 124. That is to say, the shift lever 128 has the usual universal mounting so as to permit of its being moved to and fro with facility. A cap 153 is threaded upon the upper end of the casing 124 and serves to partially enclose the opening 127. Positioned between the top of the cap and the portion 152 is a spring 154 which serves to at all times urge the portion 154 downwardly into engagement with the adjacent surface of the casing 124 defining the opening 127. The portion 152 is held against turning in the casing 124 about a vertical axis by means of a pin 155, shown in Figure 1 this pin extending into a vertical slot (not shown) in the wall of the casing, as is known.

Referring now to Figure 1, it will be observed that the lower end of the rod 150 is bent slightly out of the vertical and has an enlarged portion 156 formed on its extreme end. This enlarged end 156 is provided with a circular opening 157 through which extends a plunger rod 158. The lower end of the plunger rod 158 is formed into a spherical or knob portion 159 adapted to enter the opening 142 in the rod 30. This knob portion 159 is also adapted to be moved in the groove 141 of the intermediate shift rod 30. The upper end of the plunger rod 158 has a lateral extension 161 to which the lower end of the bent rod 160 is suitably anchored. This bent rod 160 extends through an aperture or opening 162 in the portion 152 of the shift rod 150, as well as through an opening 163 in the top of the cap 153. A compression spring 164 is positioned between the portion 152 and the lateral extension 161 of the plunger rod 158. This spring 164 surrounds the adjoining portion of the bent rod 160 and is adapted to at all times urge the plunger 158 downwardly into cooperation with the intermediate shift rod 30.

The part of the rod 160 extending above the cap 153 is bent outwardly at 165 away from the adjoining part of the rod 150. Also it will be observed that a slot 166 is provided in the rod 150 for accommodating the portion of the rod 160 immediately above the semi-spherical portion 152 of rod 150.

The uppermost end of the rod 160 terminates in an enlarged pivotally mounted part 170, including a manually engageable finger 171. The part 170 is pivotally mounted at its ends in a pair of plates 172 and 173 spaced a given distance apart to receive the rod 150. These plates 172 and 173 extend to the other side of the rod 150 and are pivotally attached to an extension 174 formed integral with the rod 150. It will be evident that by pulling upwardly on the finger 171 the rod 160 can be drawn upwardly to move the plunger 158 out of cooperation with the intermediate shift rod 30.

The enlarged portion 156 of the shift rod 150 has formed integral with it a pair of laterally extending arms 181 and 182 (Figure 4). These arms are directly opposite each other and are adapted to cooperate with the two shift rods 120 and 121, as will now be described in detail. The arm 181 has a downward extension 183 adapted to enter the slot 122 in the rod 120. Similarly, the arm 182 has a downward extension 184 adapted to enter the slot 123 in the shift rod 121. Of course, it is to be understood that when one of these arms is in the slot of the associated shift rod, the other arm will be out of engagement with the shift rod and will be positioned adjacent the rod 30, as is clearly shown in Figure 4.

Formed integral with the arm 181 is a lug 185 adapted to enter the channel 130 through the recessed portion 132. The arm 182 has formed integral therewith a lug 186 adapted to enter the channel 131 through the slot 133. The lug 186 can only enter the channel 131 when the shift lever is in a neutral position, due to the fact that the slot 133 is located intermediate the ends of the channel 131. The lug 185 can not only enter the channel when the shift rod is in a neutral position, but can also be moved into and out of the channel when the shift rod is in third of high speed. That is to say, as is evident from Figure 7, as long as the lug 185 is opposite the recessed portion 132 of the channel, the lug can be moved into and out of cooperation with the channel.

The operation of my novel transmission is briefly as follows:—Normally, when the shift lever is in neutral position the arms 183 and 184 will be disposed in the positions shown in Figure 2 or, in other words, will be out of engagement with the associated shift rods 122 and 123. Now assuming that a direct drive is desired between the member 55 and the shaft 11, it will be of course necessary to move the pinion 24 out of its position shown in Figure 1, into engagement with the clutch socket 38. This will result in a direct drive between the shaft 11 and the external gear teeth 59 and 60 formed on the member 55. The pinion 24 may be shifted by first disposing the lever in a neutral position. Thereafter, the shift lever is moved rearwardly to bring the knob 159 into engagement with the corresponding opening 142 in the central shift rod 30. Then by moving the shift rod or lever forwardly the intermediate shift rod 30 will be drawn rearwardly, thus moving the pinion 24 out of engagement with the internal gear teeth 34 of the gear ring and into mesh with the clutch socket 38. By pressing upwardly on the finger 171 connected to the shift lever, the plunger 158 can be drawn upwardly to bring the knob 159 out of engagement with the socket or opening 142 in the intermediate shift rod 30. The shift lever 128 is then in a position ready to be moved into either the forward speed or the reverse speed, as the case may be.

In order to move the gears of the accelerating and reverse transmission 16 into either low or reverse position, it is necessary that the arm 184 at the end of the shift lever be moved from neutral position into the slot 123 in the shift rod 121. Obviously when the arm is moved into this slot the lug 186 will also be moved into the slot 133 in channel 131. If the lever is thereafter pushed rearwardly the gears will be moved into their low speed position, whereas if the lever knob 151 is pushed forwardly, the gears of the transmission will be moved into the reverse speed position. That is to say, the gear 98 which is connected to the shift rod 121 by the arm 101, will be moved either into engagement with the low speed gear 108 or into co-operation with the reverse gear 115. This idea is practically the same as that employed in standard practice at the present time.

Now, if after the car is in motion (forward), it is desired to move the gearing of the transmission into the second speed position, it will be necessary to move the shift lever back into its neutral position before the same can be accomplished. Thereafter, the shift lever is actuated to bring the arm 183 into engagement with the opening 122 in the shift rod 120. This will also result in the lug 185 entering the channel 130. Then by pushing the knob 151 of the shift lever forward the lug 185 will be moved rearwardly in the channel 130 and the rod 120 will be contemporaneously moved rearwardly. This will result in the gear 94 being brought into mesh with the second speed gear 107 on the counter shaft 108. The third speed may be accomplished by moving the knob 151 rearwardly, thus causing the gear 94 to be disengaged from the second speed gear 107 and bringing the clutch socket 93 into mesh with the external gear teeth 60 of the member 55.

The principal advantage of my construction resides in the fact that should a fourth speed be desired after the car is moving in third speed, it is not necessary to first move the shift lever into neutral position in order to effect the change. That is to say, due to the recessed part 132 of the channel 130 the lug 185 can be moved out of engagement with the channel, and the arm 183 can be moved out of engagement with the shift rod 120 without the necessity of bringing the lever back into its neutral position. This will result in the transmission being left in third or high speed. Thereafter, by manipulating the manual finger 171, the knob 159 of the plunger 158 may be brought into engagement with the socket 142 in the intermediate shift rod 30, and the pinion 24 can be thus moved into engagement with the internal gear teeth 34. Obviously, due to the gear ring 35, an indirect drive will be effected between the shaft 11 and the member 55, thus resulting in a fourth speed. This indirect drive may be either an over drive or an under drive depending upon the change desired.

Thereafter the finger 171 can be manipulated to disengage the plunger 158 from the intermediate shift rod 30, which will be locked in the position to which it has been moved by the resiliently urged ball 145 previously described. The arm 183 can then be moved back into engagement with the slot 122 in the shift rod 120 and the lug 185 can be moved back into the channel 130 to permit of the movement of the gear member 91 to disengage the internal gear 93 from the external gear 60.

Thus it will be apparent that in the first instance my transmission is capable of three speeds forward and one speed reverse. By manipulating the intermediate shift rod 30 a fourth speed forward may be effected. Also, as is apparent, when the pinion 24 is in mesh with the internal gear teeth 34 the first, second, and reverse gears on the auxiliary shaft 102 will be driven at a different speed. Hence, thereafter, the first, second, and reverse speeds will be different. As a result of this my transmission is capable of having a total of six speeds forward and two speeds in reverse.

It will now be evident that by positioning the auxiliary gearing before the standard accelerating and reverse gearing the auxiliary gearing will be subjected to less torque, and hence less wear, due to its not being subjected to the same torque as the main transmission which operates at lower speed and is connected directly to the rear axle of the vehicle through the propeller shaft. In general this arrangement permits of the change speed gearing being made of lighter and smaller parts than it could be if it was located in the rear of the accelerating and reverse transmission.

Also the arranging of the change speed gearing intermediate the engine and the main transmission permits of simpler shifting mechanism and in my present construction enables a common shift rod for both the standard and auxiliary gear sets.

Furthermore, not only does this arrangement simplify the construction, but also enables a minimum number of bearings for supporting the shafts associated with the transmission. Referring to Figure 1 of the drawings it will be apparent that the shaft 62 is supported at its ends in suitable bearings, as is common practice. Also, common bearings are employed for supporting the telescoping ends of the two shafts 11 and 62, thus greatly simplifying the construction. In fact, the only additional bearing required in my construction is that associated with the internal gear ring or, namely, the roller bearing unit 40. Thus it will be seen that I have provided an unusually simple and efficient transmission system.

Now I desire it understood that although I have illustrated manually operable means, namely, the finger 171 and the rod 160 for controlling the operation of the change speed gearing, that I am not to be thus limited but only in so far as defined by the scope and spirit of the appended claims. Obviously it is possible to provide automatic means for shifting the finger 24 into and out of mesh with the clutch socket 38, such for example as a motor actuated system. The motor could be suitably controlled from the dash of a motor vehicle by means of an electric button, or the like. Then, too, it is also feasible to shift the pinion 24 by means of mechanism positively actuated by the crank shaft of the motor of the vehicle. This crank shaft driven mechanism could also be suitably controlled from the dash of the vehicle.

In résumé, it is to be understood that my invention is only to be limited by the scope and spirit of the appended claims.

I claim:

1. In combination, a drive shaft, an inner gear ring and an outer gear ring rotatably mounted about the shaft and having speed reducing driving connection one with the other, the inner ring having an interior gear and the outer ring having a clutch socket, each of the gear rings being provided in its outer face with a circumferential groove, bearing rings disposed coaxial with the gear rings and held against axial movement, the bearing rings having grooves in their inner faces, bearing rollers between the rings having radial extensions forming supplemental rollers operating in the grooves of the bearing rings and the gear rings and taking up axial thrust of said gear rings, the main rollers taking up radial thrust of the gear rings, means for gearing one of the gear rings to the drive shaft or for clutching the other gear ring to the drive shaft for direct drive, optionally, and means for optionally clutching the driven shaft to said other gear ring.

2. In combination, a gear case having a bore in one end, a driving shaft, a driven shaft, one of said shafts being piloted into the other for aligned relative rotation, a sleeve including internal and external gears embracing the outer of said shafts at the point of interengagement, anti-friction means seated in said bore and supporting said sleeve and shafts between said internal and external gears, a second sleeve having internal and external gears eccentrically journaled in said case and having its external gear in constant mesh with the internal gear of the first sleeve, and slidable means on said driving shaft for optional engagement with said second sleeve or first sleeve to drive said first sleeve either through the second sleeve or directly.

3. In combination, a gear case, driving and driven shafts journaled in the gear case and piloted into each other, one shaft having a slidable pinion splined thereupon, a sleeve journaled eccentrically with respect to said shafts, said sleeve having at one end internal gear teeth adapted to mesh with the pinion and external teeth at the other end, a second sleeve journaled in said case and having at one end internal gear teeth constantly in mesh with the external teeth of the first named sleeve, cooperating means on said second sleeve and pinion for clutching them together for direct drive of said second sleeve by the driving shaft, and means associated with said driven shaft for optionally engaging said second sleeve for direct drive of the driven shaft.

4. In combination, a gear case, driving and driven shafts journaled in the gear case and piloted into each other, one shaft having a slidable pinion splined thereupon, a sleeve journaled eccentrically with respect to said shafts, said sleeve having at one end internal gear teeth adapted to mesh with the pinion and having external teeth at the other end, a second sleeve journaled in said case having internal gear teeth at one end constantly in mesh with the external teeth of the first named sleeve, cooperating means on said second sleeve and pinion for clutching them together for direct drive of said second sleeve by the driving shaft, said slidable pinion being shiftable from meshing position with the internal teeth of the first sleeve to clutching position with the second sleeve, and means cooperatively associated with said driven shaft for optional engagement with said second sleeve for direct drive of the driven shaft from the sleeve whereby the driven shaft may be driven from the drive shaft through the intermediate elements at a gear reduction or directly.

5. In combination, a gear case, driving and driven shafts journaled in the gear case and piloted into each other, one shaft having a slidable pinion splined thereupon, a sleeve journaled eccentrically with respect to said shafts, said sleeve having at one end internal gear teeth adapted to mesh with the pinion, and external teeth at the other end, a second sleeve journaled in said case and having internal gear teeth at one end constantly in mesh with the external teeth of the first named sleeve, cooperating means on said second sleeve and pinion for clutching them together for direct drive of said second sleeve by the driving shaft, said slidable pinion being shiftable from meshing position with the internal teeth of the first sleeve to clutching position with the second sleeve, and means associated with the driven shaft including means for providing a selective driving connection between said second sleeve and said driven shaft whereby the driven shaft may be actuated from the drive shaft at a gear reduction or directly.

6. In combination, a drive shaft, a driven shaft, a pinion splined on said drive shaft, a sleeve member having internal and external gears, a second sleeve member having two sets of internal gear teeth and an external gear, the external gear of said first sleeve at all times meshing with one of said internal gears of said second sleeve, means for shifting said pinion longitudinally of said driving shaft to optionally engage the same with the internal gear of said first sleeve, or with the second internal gear of said second sleeve, and means splined on said driven shaft and longitudinally shiftable thereon for clutching engagement with the external gear of said second sleeve.

7. In combination, a driving shaft, a driven shaft, a pinion splined on said driving shaft, a sleeve member having internal and external gears, a second sleeve member having two sets of internal gear teeth and an external gear, the external gear of said first sleeve at all times meshing with one of said internal gears of said second sleeve, means for shifting said pinion longitudinally of said driving shaft to optionally engage the same with the internal gear of said first sleeve, or with the second internal gear of said second sleeve, means splined on said driven shaft and longitudinally shiftable thereon for clutching engagement with the external gear of said second sleeve, and common shifting means for selectively engaging the shiftable means carried on said driving and driven shafts.

8. In combination, a drive shaft, a driven shaft, said shafts being piloted into each other, a gear ring having two sets of internal gear teeth at one end and an external gear at the opposite end freely rotatable on said drive shaft, a second eccentrically mounted gear ring on said drive shaft having an internal gear and an external gear, said external gear being constantly in mesh with one set of internal gear teeth of said first gear ring, a pinion splined on said drive shaft for selectively engaging the internal gear of said second gear ring and the second set of internal gear teeth of said first gear ring, a second pinion splined on said driven shaft for engaging the external gear of said first gear ring, and a common shift lever having means for selectively actuating each of said pinions.

9. In combination, a drive shaft and a driven shaft piloted into each other, a gear ring freely rotatable upon said drive shaft and having a groove in the external surface thereof, bearing members for said ring having enlarged portions engaging in said groove to take up axial thrust of said ring, a second eccentrically mounted gear ring in constant mesh with said first gear ring, a pinion splined on said drive shaft for selectively engaging said second gear ring to drive said first gear ring through a speed reduction or for directly engaging said first gear ring, a second pinion splined on said driven shaft and adapted to engage said first gear ring, and a common shifting lever having means engaging said pinions whereby said driven shaft may be driven directly through said drive shaft, or through a gear reduction from said drive shaft, as desired.

10. In a transmission, a gear ring for transmitting movement from a drive shaft to a driven shaft including a double set of external gear teeth at one end thereof, a first set of internal gear teeth at the opposite end thereof, a second set of internal gear teeth spaced outwardly from said first set of internal gear teeth, and an external groove in said ring adapted to receive anti-thrust bearing members.

11. In a transmission, a gear ring for transmitting drive from a drive shaft to a driven shaft including a double set of external gear teeth at one end thereof, each of the teeth of each of said sets of teeth being formed integral with and as a continuation of the corresponding tooth of the other set, a first set of internal gear teeth at the opposite end thereof, a second set of internal gear teeth spaced outwardly from said first set of internal gear teeth, and an external groove in said ring adapted to receive anti-thrust bearing members.

In witness whereof, I hereunto subscribe my name this 4th day of November, 1926.

THOMAS L. FAWICK.